Dec. 3, 1968     S. A. CORY     3,414,752
ROTOR ARRANGEMENT FOR A SYNCHRONOUS MOTOR DRIVE
Filed June 8, 1966
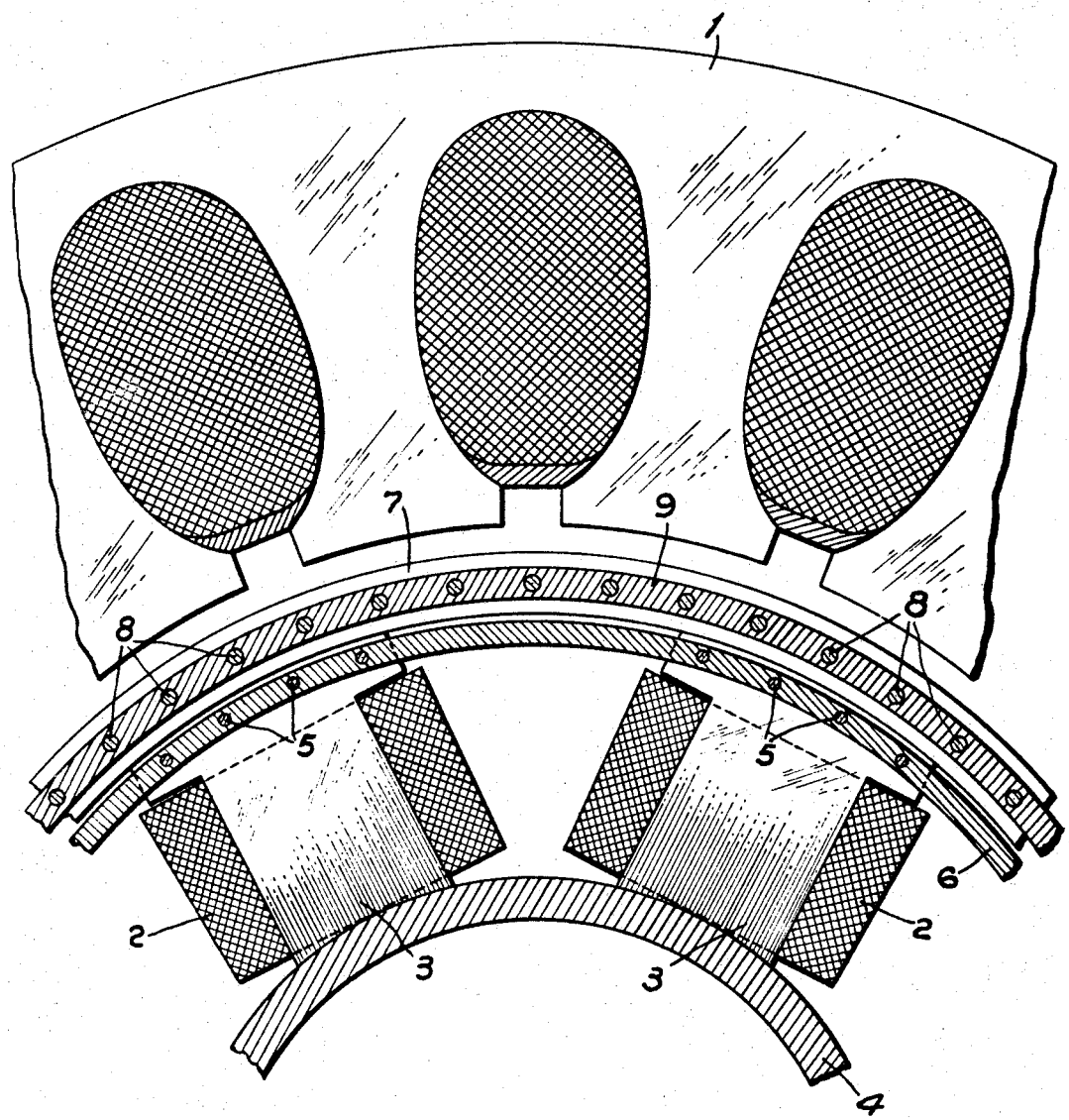
INVENTOR.
STANLEY A. CORY
BY
*Charles L. Johnson Jr.*
ATTORNEY

3,414,752
ROTOR ARRANGEMENT FOR A SYNCHRONOUS MOTOR DRIVE
Stanley A. Cory, Canoga Park, Calif., assignor to International Telephone and Telegraph Corporation, Nutley, N.J., a corporation of Maryland
Filed June 8, 1966, Ser. No. 556,218
4 Claims. (Cl. 310—269)

This invention relates to a rotor arrangement for a synchronous drive and more particularly to an improved rotor construction for a synchronous drive motor.

There is a great demand by users of synchronous motors for a motor which will have an inherent electrical "stiffness" at true synchronism, and still be individually adjustable to compensate for speed variations caused by changes in load or inherent material imperfections. There are numerous applications in which true synchronisms and adjustments to individual systems are desirable, such as, rotating antennae, tracking platforms, computer memory drums, gyroscope drives, and recording devices.

An object of this invention is to provide an improved rotor construction for a synchronous drive to achieve the above-mentioned demands.

Another object of this invention is to provide a rotor arrangement for a synchronous drive having extreme accuracy of angular velocity.

Yet, another object of this invention is to provide a rotor construction for a super-synchronous drive that can be made to operate at any desired speed with extreme accuracy and control.

A feature of this invention is that the rotor design for such a synchronous drive is unique, in that it is a combination of induction rotor, hysteresis rotor, and the salient pole electro-magnetically energized rotor. The inner assembly of the rotor consists of a number of laminated pole assemblies electrically and mechanically matched to the stator. The tips of the laminated poles may, or may not, have caged conductors in their faces depending on the service requirements. Around the periphery of the salient pole will be formed hysteresis material which, according to the diameter of the rotor will be wound on in the form of tape or applied as a solid ring. For some applications the hysteresis ring may have auxiliary conductors, thus providing a second cage.

The machine will be started by applying voltage to the stator with the rotor field circuit open, or possibly short circuited through an external high resistance. The cage in the face of the salient pole and the cage in the hysteresis ring, if present, will supply torque causing the rotor to rotate and to closely approach synchronous speed. As true synchronous speed is approached, the torque produced by the cage or cages falls to zero, but the rotor will accelerate into true synchronism by virtue of the hysteresis torque supplied by the hysteresis ring, and also by the saliency produced if the salient poles are now energized by a suitable direct current.

The extreme accuracy of control of angular velocity is achieved by a combination of three forces, one of which is continuously variable, in the following manner. Any sudden load or changed external condition which might cause a rapid variation from synchronous speed will be resisted by the strong restoring torque which will be automatically applied by the cages. A slight change in normal running conditions will be resisted by the hysteresis torque generated by the peripheral hysteresis ring. These two torques will be automatically applied, to an extent determined by the degree of external load variations. In addition to, and supplementing the restoring torques, must be considered the torque produced by the saliency of the electro-magnetic poles. According to the degree of excitation currents supplied, this may be a very strong or a very weak torque, but it has the advantage of being continuously adjustable so that in effect, it is possible to "tune" each individual drive system to a position of minimum change of angular velocity and automatically compensate for speed variations caused by changes in load or inherent materials imperfections, such as varying airgaps caused by eccentricity of the rotor or stator, or inconsistent hysteresis materials.

It is really appreciated that irrespective of the saliency produced by the salient poles, the rotor will have an inherent electrical "stiffness" which can be controlled, to a great extent, in the basic design of the rotor and stator by the correct selection of design parameters and materials for the hysteresis ring and cages. The extremely fine control of angular velocity may be made by varying the magnetic flux in the salient poles. This "fine" control of angular velocity, by changing the excitation current, lends itself readily to an automatic servo control of the complete synchronous drive system.

With the foregoing, other features and objects of this invention will become more apparent by reference to the following description taken in conjunction with the accompanying drawing in which:

The sole figure is a fragmentary sectional view showing the rotor arrangement according to the invention.

Referring to the sole figure, the stator 1 follows the orthodox 2 or 3 phase design. An exciting coil 2 is wound around a solid or laminated salient pole piece 3, and the total structure is fastened to a solid magnetic ring 4 which represents the return magnetic path for pole 3. Ring 4 is rotatably mounted with respect to stator 1 in a known manner. A plurality of rotor bars 5 are embedded in the salient poles 3, these bars extend slightly beyond the poles 3 and are brazed or soldered to a narrow annular end ring 6, a similar end ring is located on the opposite end. Around the periphery of the pole assemblies 3 is secured a ring of hysteresis material 7, for example cobalt alloy 81 or 83, this ring may be solid or incorporate a series of peripheral ring bars 8 and associated annular end ring 9 with a similar end ring on the opposite end not shown.

At starting, coils 2 connected to slip rings in a known manner are opened, or short-circuited by an external high resistor, and a 2 or 3 phase current is supplied to this stator 1. The resultant rotating field in the stator will induce a starting torque in the rotor bars 5 and also in the peripheral ring bars 8 if incorporated within the hysteresis ring. This torque will normally accelerate the rotor to about 90 to 98 percent of its true synchronous speed, depending on the cage design and the resistivity of the materials chosen for 5 and 8. Beyond this point, the rotor will drift into synchronism automatically by virtue of the hysteresis torque induced into the peripheral ring 7, or will jump readily into a polar oriented synchronous condition by a direct current being applied to the exciting coils 2.

The high accuracy in constant angular velocity will be achieved by the tendency of the bars 5 and 8 to resist any change in torque, the ability of the elector-magnetic salient poles 3 to follow truly a rotating field, and the desire of the hysteresis ring 7 to remain in true synchronism and to resist any change in angular velocity. The addition of the hysteresis angular ring 7, with or without the bars 8, will considerably improve smooth running and reduce any angular velocity changes in what might otherwise be considered a normal electro-magnetic salient rotor.

The reduction of angular velocity change can be further improved by varying the D.C. power applied to the exciting coils 2. This will enable the power factor for any desired load to be changed from leading, lagging, or unity to suit best the particular load being driven. In addition, by varying the input voltage and frequency to the stator this motor can be made to operate at true synchronism at any desired speed with extreme accuracy and control.

While I have described above the principal of my invention in connection with a specific embodiment, other modifications and embodiments will be apparent to those skilled in the art and all such modifications and embodiments are within the scope of this invention.

I claim:
1. Rotor apparatus for a synchronous motor comprising:
   a magnetic ring;
   a plurality of salient poles attached to said magnetic ring, said ring to act as a magnetic return path for said poles;
   a plurality of rotor bars in said poles;
   a first pair of annular end rings terminating the ends of said rotor bars;
   an exciting coil wound around each of said salient poles; and
   a peripheral ring of hysteresis material formed to surround the periphery of said poles.

2. A rotor arrangement according to claim 1, further including:
   a plurality of peripheral ring bars in said peripheral ring; and
   a second pair of annular end rings terminating the ends of said peripheral ring bars.

3. Rotor apparatus for a synchronous machine having a poly-phase stator winding, the improvement which comprises:
   a magnetic ring;
   a plurality of salient poles circumferentially spaced on said magnetic ring, each of said poles having a plurality of axially extending holes within the pole tips, said magnetic ring acting as a magnetic return path for said poles;
   a plurality of rotor bars embedded in and substanially filling said holes;
   a first pair of angular end rings, each one of said first pair secured to one end of said rotor bars for electrically connecting all of said rotor bars;
   an exciting coil on each of said salient poles; and
   a peripheral ring of hysteresis material located around the periphery of said poles, whereby the combination of torques produced by said rotor bars, said hysteresis ring, and said salient poles effect the synchronous speed of said machine.

4. A rotor arrangement according to claim 3, further including:
   a plurality of peripheral ring bars circumferentially spaced and axially embedded in said peripheral ring; and
   a second pair of annular end rings, each one of said second pair secured to one end of said peripheral ring bars for electrically connecting all of said ring bars, whereby said peripheral ring bars act in conjunction with said rotor bars to affect the speed of said machine.

References Cited
UNITED STATES PATENTS

| | | | |
|---|---|---|---|
| 2,209,334 | 7/1940 | Jungk | 310—269 |
| 3,013,168 | 12/1961 | Ellis | 310—261 X |
| 3,038,092 | 6/1962 | Bekey | 310—162 |

WARREN E. RAY, *Primary Examiner.*